United States Patent
Henry, III

[11] 3,825,286
[45] July 23, 1974

[54] PIPING CONNECTOR

[75] Inventor: Calvin Scott Henry, III, Umpqua, Oreg.

[73] Assignee: Winery Systems, Inc., Folsom, Calif.

[22] Filed: Jan. 8, 1973

[21] Appl. No.: 321,756

[52] U.S. Cl. .................. 285/93, 285/38, 285/155, 285/156, 285/197, 285/DIG. 2
[51] Int. Cl. ............................................. F16l 35/00
[58] Field of Search ............ 285/197, 93, 198, 199, 285/DIG. 2, 155, 156, 38; 138/39, 89

[56] References Cited
UNITED STATES PATENTS

| | | | |
|---|---|---|---|
| 873,689 | 12/1907 | Von Winkle | 285/197 |
| 967,483 | 8/1910 | Andrews | 285/155 X |
| 1,908,821 | 5/1933 | Cornell | 285/197 |

FOREIGN PATENTS OR APPLICATIONS

| | | | |
|---|---|---|---|
| 968,700 | 5/1950 | France | 285/197 |
| 98,717 | 8/1961 | Norway | 285/197 |

Primary Examiner—Dave W. Arola
Attorney, Agent, or Firm—Lothrop & West

[57] ABSTRACT

A piping connector includes a primary pipe of predetermined internal diameter, having a primary axis and having an opening through the pipe wall with a transverse dimension about equal to the primary internal diameter. A saddle is adapted to be removably clamped to one side of the primary pipe overlying the opening. A secondary pipe of an external diameter about equal to said internal diameter and having a secondary axis extends through the saddle and is secured thereto with the secondary axis intersecting the primary axis at a predetermined angle. The end of the secondary pipe within the primary pipe terminates in a curve with an opening on one side and in possible other ways and in one case terminates in a plane bisecting the minimum angle between the primary and secondary axes. Preferably, a flexible hose is secured to the outside end of the secondary pipe.

10 Claims, 5 Drawing Figures

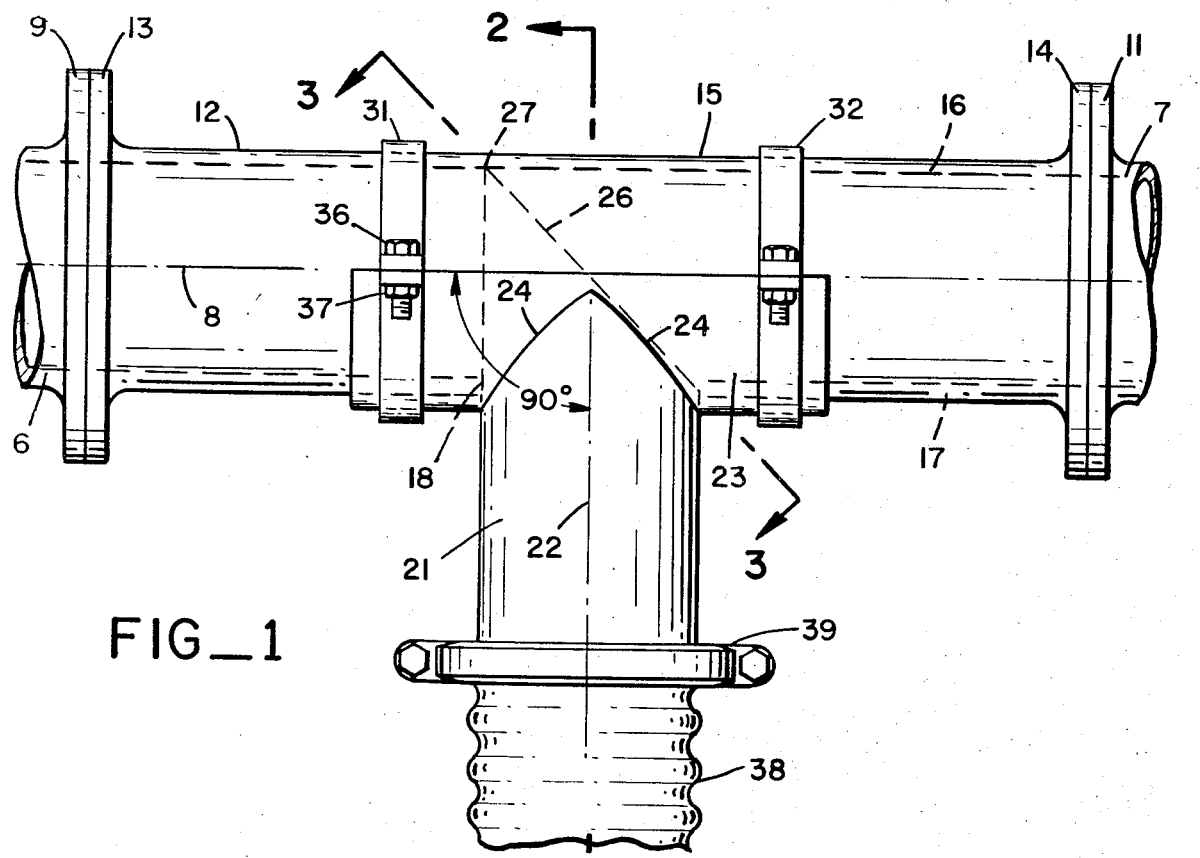
FIG_1
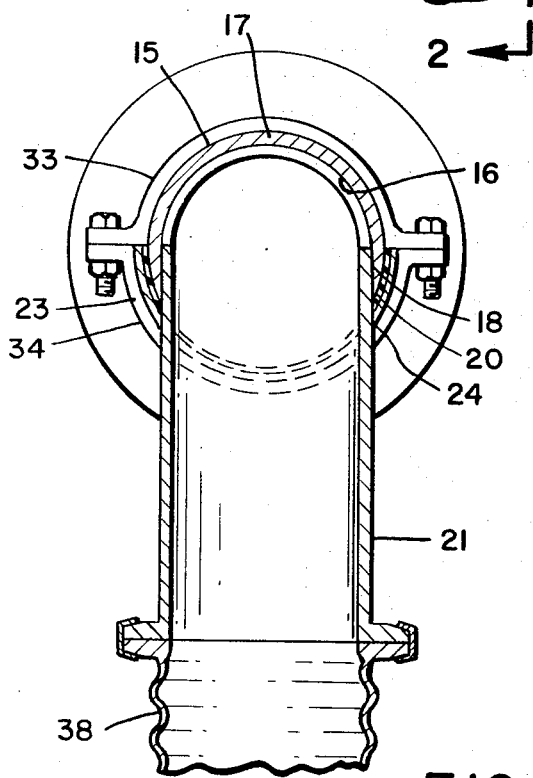
FIG_2
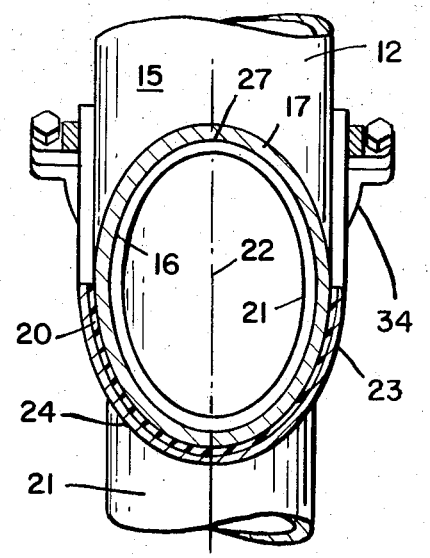
FIG_3

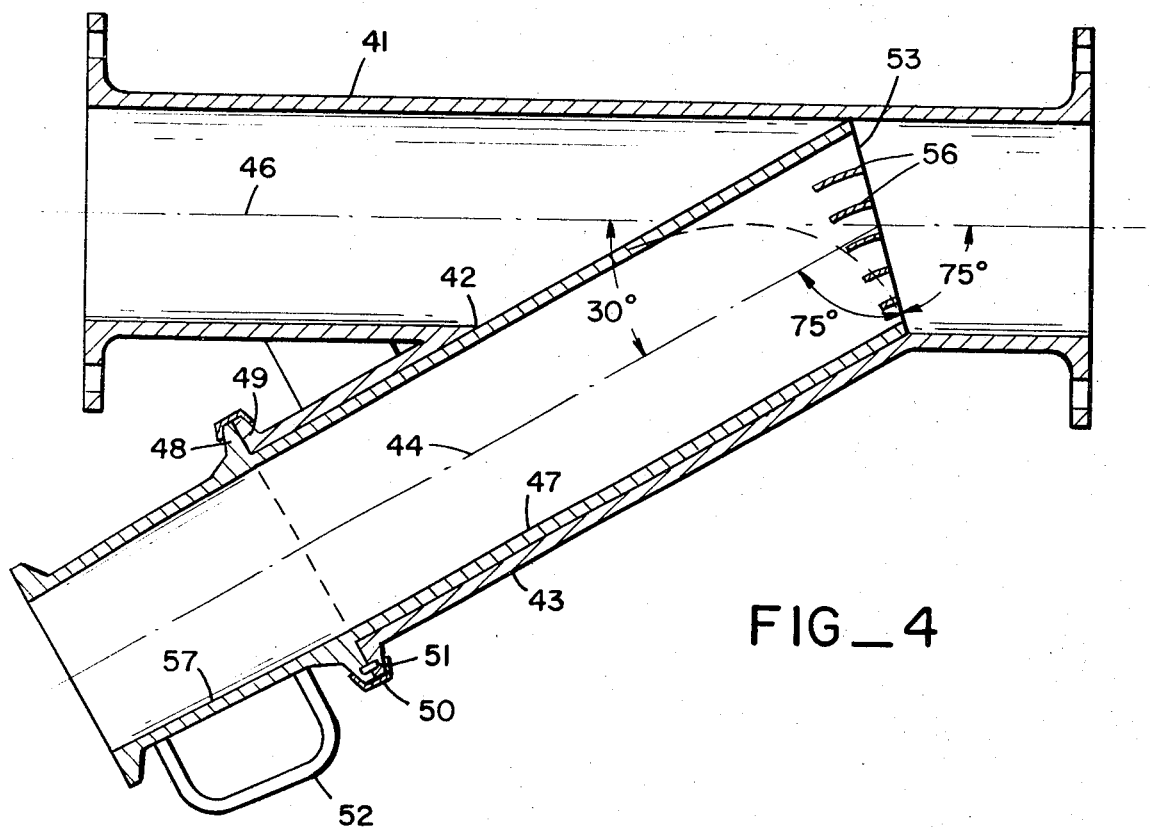
FIG_4
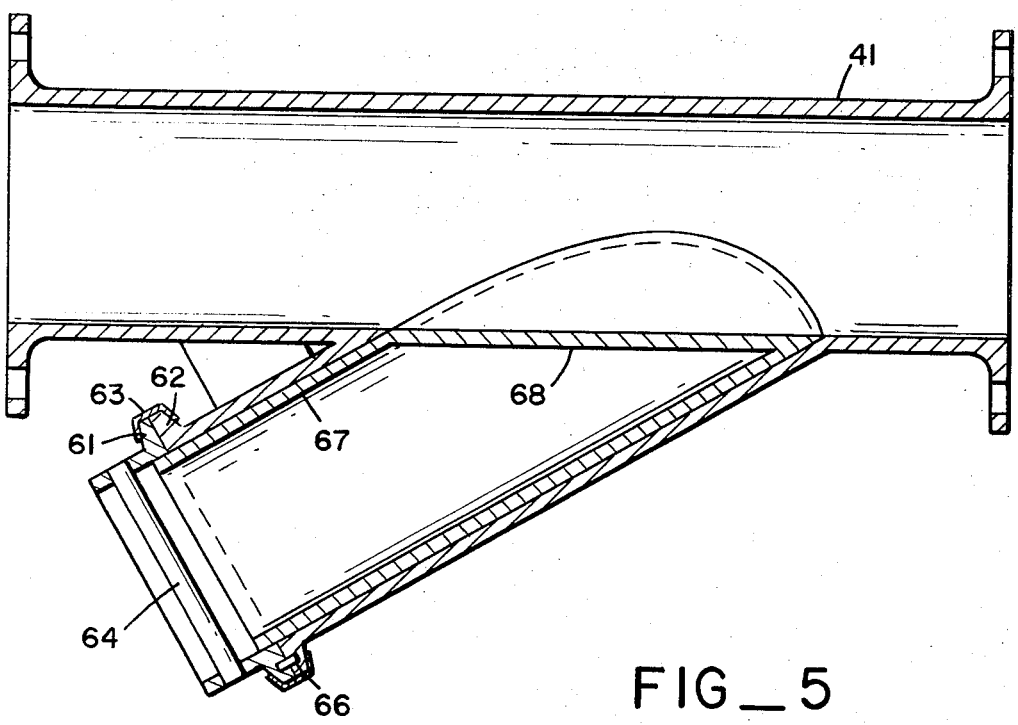
FIG_5

PIPING CONNECTOR

In many environments there are piping arrangements for fluids not necessarily but usually of a rather thick or viscous nature, such, for example, as various slurries, wine making material such as pomace and the like. In these cases leakage is not desired but some leakage is tolerable. Ease and quickness of change are important. Ready assembly and disassembly for sterilization and maintenance are imperative. Many piping systems already available, usually of stainless steel, are effective to change the nature of flow between the various different parts of the system but involve complex valves and fittings of various sorts. The parts are usually standard but are relatively expensive, difficult to change quickly and are not always easy to assemble and disassemble for the necessary care.

It is therefore an object of the invention to provide a piping system in which virtually standard piping can be utilized with some modification and special parts to afford a quick and easy system of changing the flow in the piping system and for blocking or throttling the flow. At the same time the system affords ready parts interchange, quick assembly and disassembly and easy access for sterilization and attention.

Another object of the invention is to provide a piping system in which virtually standard pipe forms are utilized and customary materials are employed all to the end that a relatively simple, inexpensive yet unique and versatile piping system can be afforded.

Another object of the invention is in general to provide a substantially improved piping system.

Other objects, together with the foregoing, are attained in the embodiments of the invention described in the accompanying description and illustrated in the accompanying drawings, in which:

FIG. 1 is a side elevation, portions being broken away, of one form of a piping system pursuant to the invention;

FIG. 2 is a cross-section, the plane of which is indicated by the line 2—2 of FIG. 1;

FIG. 3 is a cross-section, the plane of which is indicated by the line 3—3 of FIG. 1;

FIG. 4 is a cross-section on a vertical longitudinal plane through a modified form of the invention; and FIG. 5 is a view similar to FIG. 4 but showing a still further modified form of the invention.

While this piping system finds application in a number of widely different fields, it has with considerable success been embodied substantially as shown herein and as employed in the wine industry for conducting pomace and other fluid materials which are primarily liquid but also contain materials such as skins, seeds and the like, and, as a whole, are relatively viscous.

In one installation there are provided units in a regular pipe line comprised of a section 6 and a section 7 spaced apart but aligned along a longitudinal axis 8 which in this instance extends approximately horizontally. The sections 6 and 7 terminate in bolting flanges 9 and 11. References to "pipe" herein are intended to include other types of fluid conduits such as rubber hose or plastic tubing.

Pursuant to the invention there is interposed between the sections 6 and 7 in the pipe line and coincident with the primary axis 8 a special primary pipe 12. This is a conduit having a substantially circular-cylindrical cross-section terminating in flanges 13 and 14 readily secured to the flanges 9 and 11 by any suitable and well-known means. The primary pipe 12 is formed with an exterior surface 15 and with a circular-cylindrical interior surface 16 of a predetermined diameter. The primary pipe wall 17 (FIG. 2) between the outside surface 15 and the inside surface 16 is of a predetermined thickness and is generally continuous. At a convenient point the wall 17 is interrrupted to provide an opening 18 such as would be made by the normal intersection with the wall of a right circular-cylindrical member. The opening 18, at least in its transverse dimension, is about the same size as the predetermined internal diameter of the primary pipe 12. The pipe referred to above as "special" is special only to the extent it has a side opening, and any existing pipe can be used by merely providing such an opening.

Designed to be utilized with the primary pipe 12 is a secondary pipe 21 of circular-cylindrical exterior configuration symmetrical about a secondary axis 22 arranged generally to intersect the primary axis 8. The secondary pipe 21 has a diameter externally which is substantially the same as the diameter internally of the surface 16 of the primary pipe. The secondary pipe can be introduced through the opening 18 and makes a reasonably close fit therewith.

Appropriately to hold and position the primary pipe with respect to the secondary pipe, there is preferably provided a saddle 23. This is essentially a semi-cylindrical member of about the extent of half of the primary pipe 12. The saddle is designed to fit directly against the primary pipe overlying the opening 18. Alternatively, the saddle can very nearly abut the primary pipe but with an appropriate, elastic gasket therebetween. The saddle is secured to the secondary pipe 21 along the line 24 of the intersection of the secondary pipe and the saddle. The relationship of the saddle and the secondary pipe is such that the secondary pipe traverses the primary pipe.

To afford a reasonably snug or tight interconnection or interfitting between the two pipes, the secondary pipe at its inner end is terminated in a curve to fit the primary pipe and to afford an opening on one side so that the secondary pipe can conduct flow into the primary pipe in one direction and block flow into the primary pipe in the opposite direction. In one instance, the secondary pipe is truncated along a plane 26 extending transversely and disposed at an angle to bisect the minimum angle between the primary axis 8 and the secondary axis 22. For example, if the axes 8 and 22 intersect at right angles or at 90° to each other, as shown in FIG. 1, then the angle of the bisecting plane 26 is one-half the minimum angle or is 45°, also as shown in FIG. 1.

The distance of the tip 27 of the secondary pipe from the inside surface of the saddle is such that the tip 27 just barely abuts the inside surface 16 of the primary pipe when the parts are fully assembled. Since a 45 degree planar intersection of a circular-cylindrical tube is an ellipse, as shown in FIG. 3, the ellipse of the secondary tube defined by its outside surface and the ellipse of the primary tube defined by its inside surface are substantially coincident. When the saddle is appropriately assembled and snugged, as shown in FIG. 1, the two pipe surfaces come very close together. In fact, the closeness of pipe abutment at assembly depends upon the degree of fineness of manufacture of the pipe and of the saddle. In any case, it is easy to make a functionally or adequately tight intersection between the primary pipe and the secondary pipe.

To hold the two pipes in proper relationship, the saddle is positioned and is held by a pair of clamps 31 and 32. These can be of any convenient form. In the present instance each clamp has an upper half 33 and a lower half 34 secured together by appropriate bolts 36 and nuts 37.

The parts can readily be assembled and disassembled merely by loosening and slipping the clamps 31 and 32. This action is facilitated if the secondary pipe 21 is joined to a flexible hose 38 having a removable clamp 39 for securing the hose to the enlarged end of the secondary pipe 21. Other means such as pipe clamps or slip joints could be used.

With this arrangement, the user, by loosening the clamps and removing them or sliding them to one side, can position or re-position the secondary pipe 21 exactly as shown in FIG. 1. The clamps are then reinstalled. Vertically upward flow in the secondary tube will turn entirely to the right toward the pipe section 7, in FIG. 1. The elliptical fit between the secondary and primary pipes precludes any substantial flow toward the left or into the left-hand pipe section 6 in that figure. Furthermore, when the clamps are removed the user may withdraw the secondary pipe 21, rotate it a half turn and reintroduce it through the opening 18 and clamp it in its new, rotated position. Then upward flow is from the secondary pipe to the left and into the pipe section 6 rather than to the right and into the pipe section 7. This connection can easily be made in a very few minutes. When disassembled the inside of the pipe 12 and the inside of the pipe 21 can easily be inspected. The sections can be removed from the pipe line for sterilization without any difficulty whatsoever. Fluid flow can be in a sense opposite to that described; i.e. downwardly in pipe 21 from the right or from the left.

It is possible to provide a similar arrangement, as shown in FIG. 4, but at a different intersection angle. In this instance the structure is substantially as previously described. It includes a primary pipe 41 installed as before. Instead of having simply an opening therein the pipe 41 has an opening 42 defined by the intersection of a sleeve 43 symmetrical about a secondary axis 44 and intersecting the primary axis 46 of the primary pipe 41 at an angle of substantially 30°.

In this instance a secondary pipe 47 has a saddle 48 in the nature of a flange which abuts a comparable flange 49 on the primary pipe 41, being secured thereto by a removable clamp 50. An indexing pin 51 engaging both of the flanges 48 and 49 makes sure that the primary pipe and the secondary pipe are in proper rotated relationship.

If desired, a handle 52 can be provided on the secondary pipe for assisting the user and helping him to guide the parts into position. As in the first example, the secondary pipe 47 is appropriately terminated in an inclined, transversely extending, planar surface 53 which is arranged to bisect the minimum angle between the primary axis 46 and the secondary axis 44. The minimum angle between those axes is 150° so that the surface 53 is at an angle of 75° to the axis 44 and also is at an angle of 75° to the axis 46.

In this instance, while the ellipse is of a somewhat different shape, there is nevertheless an elliptical intersection between the primary pipe and the secondary pipe just as before so that there is a relatively tight fit.

If desired, there may be turning vanes 56 provided so as to assist the flow in turning from one pipe into the other. Also, the secondary pipe may have a reduced end 57 for appropriate adaptation to the next unit in the piping system, such as a flexible hose, not shown.

In this instance, in order to change the parts, it is merely necessary to remove the clamp 50 and then to withdraw the secondary pipe from the primary pipe, taking the saddle 48 with it.

A variation is shown in FIG. 5 and is especially adapted for use with the construction of FIG. 4. In this instance the primary pipe 41 is just as previously described. Instead of providing a flow path between primary and secondary pipes, there is a stop. This is afforded by a saddle 61 designed to engage a flange 62 on the sleeve of the primary pipe 4! by means of a clamp 63. The saddle carries a cross bar 64 as a hand hold and likewise has a pilot pin 66 for aligning the parts. The the saddle is affixed a secondary pipe 67 terminating in a blocking palte 68. This is of an arcuate contour fitting or even with the inside of the primary pipe 41 and has substantially the same intersection therewith as does the secondary pipe 47 of FIG. 4. In this instance it is easy to withdraw the pipe section 47 and to plug the opening by means of the device of FIG. 5, it being merely necessary to loosen and restore the clamp when the unit has been changed in order to alter the pipe line from a flowing arrangement into a blocked arrangement.

What is claimed is:

1. A piping connector comprising:
   a. a primary pipe extending along a primary axis and having a wall establishing an internal diameter of a predetermined dimension;
   b. means defining an opening through said wall and having a transverse dimension substantially equal to said diameter;
   c. a secondary pipe extending along a secondary axis and having a wall establishing an external diameter substantially the same as said predetermined dimension;
   d. a saddle overlying said opening, said saddle being secured to said secondary pipe with said secondary axis disposed at an angle relative to said saddle;
   e. means for removably securing said saddle to said primary pipe overlying said opening, and with said secondary axis intersecting said primary axis at a predetermined angle; and,
   f. means defining an end on said secondary pipe within said primary pipe and disposed in a plane bisecting the minimum angle between said primary axis and said secondary axis, said end defining a curve having one side substantially coincident with said wall of said primary pipe to preclude fluid flow through said one side, the other side of said curve affording an opening to permit fluid flow from said primary pipe to said secondary pipe and vice versa.

2. A device as in claim 1 in which said saddle is substantially entirely disposed on one side of said primary pipe.

3. A device as in claim 1 in which said securing means engages said saddle and said primary pipe.

4. A device as in claim 1 in which said secondary pipe extends through said saddle.

5. A device as in claim 1 in which a gasket is interposed between said saddle and said primary pipe.

6. A device as in claim 1 including a flexible hose, and means for securing said hose to said secondary pipe outside said primary pipe.

7. A device as in claim 1 including means for indexing said secondary pipe relative to said primary pipe.

8. A device as in claim 1 in which said primary pipe and said secondary pipe are both circular in cross section in planes perpendicular to their respective axes.

9. A piping connector comprising:
 a. a primary pipe extending along a primary axis and having a wall establishing an internal diameter of a predetermined dimension;
 b. a sleeve symmetrical about a secondary axis, said sleeve intersecting said primary pipe and defining an opening therein at the intersection;
 c. a flange on the outer end of said sleeve;
 d. a secondary pipe extending along said secondary axis within said sleeve;
 e. a saddle on the outer end of said secondary pipe adjacent said flange;
 f. means for detachably connecting said saddle to said flange; and
 g. a stop plate extending across the inner end of said secondary pipe substantially as a continuation of said wall of said primary pipe and spanning said opening, said stop plate being selectively removable in dependence upon the withdrawal of said secondary pipe from said sleeve.

10. A piping connector as in claim 9 further including means for indexing said secondary pipe in properly rotated alignment relative to said sleeve.

* * * * *